United States Patent [19]

Ashjian et al.

[11] Patent Number: 5,400,427
[45] Date of Patent: Mar. 21, 1995

[54] FIBER OPTIC CABLE AND VISCOUS FILLER MATERIAL

[75] Inventors: Henry Ashjian, East Brunswick, N.J.; Dong-Ming Shen, Langhorne, Pa.; Margaret M. Wu, Skillman, N.J.

[73] Assignee: Mobil Oil Corporation, Fairfax, Va.

[21] Appl. No.: 136,839

[22] Filed: Oct. 18, 1993

[51] Int. Cl.⁶ .................................................. G02B 6/44
[52] U.S. Cl. ..................................... 385/102; 585/352
[58] Field of Search ....................... 385/100, 101, 102; 585/352, 22, 220, 392; 521/52

[56] References Cited

U.S. PATENT DOCUMENTS

| | | | |
|---|---|---|---|
| 4,441,787 | 4/1984 | Lichtenberger | 350/96.23 |
| 4,602,763 | 7/1986 | Gaylin | 254/134.3 |
| 4,653,851 | 3/1987 | Pedersen et al. | 350/96.23 |
| 4,688,890 | 8/1987 | DeMeo et al. | 350/96.23 |
| 4,749,059 | 6/1988 | Jonnes et al. | 184/15.1 |
| 5,019,660 | 5/1991 | Chapman et al. | 585/22 |
| 5,053,434 | 10/1992 | Chapman | 521/52 |

OTHER PUBLICATIONS

10 Kirk-Othmer Encyclopedia of Chemical Technology 125 et seq. (3rd ed., 1980) vol. 10, pp. 125–147 (Fiber Optics).

Primary Examiner—Akm E. Ullah
Attorney, Agent, or Firm—Alexander J. McKillop; Dennis P. Santini; Robert B. Furr, Jr.

[57] ABSTRACT

The invention provides a fiber optic cable and a diamondoid-based viscous filling material for a fiber optic cable.

6 Claims, 1 Drawing Sheet

FIBER OPTIC CABLE AND VISCOUS FILLER MATERIAL

FIELD OF THE INVENTION

This invention relates to an optic fiber cable and a viscous filler material useful in the manufacture and installation of optic fiber cables.

BACKGROUND OF THE INVENTION

Fiber optics have been in use for many years, in applications such as medical endoscopes, cathode ray tube faceplates, flexible light distribution bundles, automobile indicator lamps, and borescopes, which require light transmission of a few meters at most. More recently, fiber optics have entered the telecommunication field, transmitting signals over distances several orders of magnitude longer. For a survey of the development of fiber optics, see 10 Kirk-Othmer Encyclopedia of Chemical Technology 125 et seq. (3rd ed., 1980).

U.S. Pat. Nos. 4,441,787 to Lichtenberger and 4,653,851 to Pedersen et al. teach fiber optic cables and methods for manufacturing the same. The Lichtenberger and Pedersen et al. patents are incorporated herein by reference for the details of fiber optic cable design and manufacture. U.S. Pat. No. 4,749,059 to Jonnes et al. teaches a cable lubricating device useful for applying grease to a fiber optic cable, and is incorporated herein by reference.

U.S. Pat. No. 4,602,763 to Gaylin discloses a method for drawing a fiber optic cable through a conduit, and is incorporated herein by reference.

U.S. Pat. No. 4,688,890 to DeMeo et al. relates to a fiber optic cable innerduct for containing and protecting fiber optic cable and for reducing the drag on fiber optic cable as it is pulled through the innerduct. The DeMeo et al. patent is incorporated herein by reference.

The fiber optic cables used commercially typically comprise an inner optic fiber surrounded by a protective sheath. The optic fiber is typically lubricated, and the outer shell of the protective sheath may also be lubricated to reduce friction when drawing the assembly through a conduit for installation. Proper lubrication between the optic fiber and the protective sheath helps to minimize microbending and the concomitant signal loss. Further, the cushioning effect of a viscous lubricant renders the optic cable assembly more resistant to impact damage. See the Lichtenberger '787 patent at column 2, lines 26-69, and also column 5.

The telecommunications industry needs optic cable assemblies which can be easily installed (e.g., buried underground) and then operated for decades without maintenance. Thus the cable filler material or lubricant must not only be thermally and oxidatively stable, but must also be inert to the cable sheath material. Additionally, the cable filler material should be resistant to biodegradation. The optic cables should also be suitable for installation and use over a wide range of temperatures, particularly in cold winter conditions. The goals of lubricant inertness (including thermal and oxidative stability, as well as resistance to biodegradation) and substantially constant viscosity and lubricity over a broad range of temperatures have, in the past, been in conflict because lower molecular weight solvents (which tended to deteriorate the cable sheath material) were required to attain the desired low temperature viscosity and lubricity characterisitics.

Efforts to improve upon the performance of natural mineral oil based lubricants by the synthesis of oligomeric hydrocarbon fluids have been the subject of important research and development in the petroleum industry for at least fifty years and have led to the relatively recent market introduction of a number of superior polyalpha-olefin synthetic lubricants, primarily based on the oligomerization of alpha-olefins or 1-alkenes. In terms of lubricant property improvement, the thrust of the industrial research effort on synthetic lubricants has been toward fluids exhibiting useful viscosities over a wide range of temperature, i.e., improved Viscosity Index, while also showing lubricity, thermal and oxidative stability and pour point equal to or better than mineral oil. To match synthetic lubricants with their intended application, these lubricants have, in the past, been formulated for specific properties. For example, poly-alpha-olefins (PAO) were produced from 1-decene polymerization over promoted $BF_3$ or $AlCl_3$ catalysts. While poly-alpha-olefins are useful components in fiber optic cable filler materials, it would be desirable to provide fiber optic cable filler materials with still further improved lubricity, oxidative stability, thermal stability, and resistance to biodegradation over a broad range of temperatures.

SUMMARY OF THE INVENTION

The invention provides, in a first aspect, a fiber optic cable assembly comprising:
(a) at least one optical fiber;
(b) a sheath longitudinally surrounding and substantially concentric with said optical fiber;
(c) a grease in contact with said optical fiber and said sheath, said grease comprising at least about 70 weight percent diamondoid-containing compounds, of which diamondoid compounds at least about 65 weight percent are alkyl-substituted diamondoid compounds, and a thickener component which is substantially inert to said sheath.

The diamondoid component of the grease preferably contains at least about 65 weight percent of diamondoid compounds which have more than one quaternary carbon atom per molecule and less than about 35 weight percent of diamondoid compounds which have less than two quaternary carbon atoms per molecule. The grease preferably comprises at least 75 weight percent diamondoid-containing compounds, more preferably at least about 80 weight percent or more of diamondoid-containing compounds.

The invention provides, in a second aspect, a grease composition comprising a diamondoid component comprising at least about 65 weight percent alkyl-substituted diamondoid compounds which have more than one quaternary carbon atom per molecule and less than about 35 weight percent of diamondoid compounds which have less than two quaternary carbon atoms per molecule; and a thickener component which is substantially inert to a fiber optic cable sheath.

The diamondoid component of the grease for the invention preferably contains less than about 1 weight percent non-hydrocarbons. Examples of diamondoid compounds which contain more than one quaternary carbon include 1,3-dimethyladamantane; 1,3,5-trimethyladamantane; 1,3,5,7-tetramethyladamantane; cis- and trans-1,3,4-trimethyladamantane; 1,2,5,7-tetramethyladamantane; 4,9-dimethyldiamantane; 1,4-dimethyldiamantane; 2,4-dimethyldiamantane. The diamondoid component of the grease of the invention preferably contains more than 80 weight percent of diamondoid compounds having more than one quaternary carbon atom per molecule and less than 20 weight percent of diamondoids having fewer than two quaternary carbon atoms per molecule.

The diamondoid component of the grease of present invention comprises a diamondoid-based composition which: (a) is substantially inert to commonly used cable sheath materials; (b) has an unusually high Viscosity Index; (c) maintains its thermal and oxidative stability, as well as its chemical inertness to commonly used sheath materials, over extended periods of time, i.e. decades.

In a third aspect, the present invention provides a fiber optic cable grease comprising a diamondoid component containing at least about 10 different diamondoid compounds selected from the group consisting of methyl-substituted and ethyl-substituted adamantane, diamantane, triamantane, and higher homologs, wherein each of said selected diamondoid compounds comprises no more than about 10 weight percent of said diamondoid component; and a second component comprising a thickener which is substantially inert to common fiber optic cable sheath materials, e.g. Kevlar brand aramid fiber manufactured by E. I. DuPont de Nemours and Company of Wilmington, Del. This diamondoid component of the second fiber optic cable grease composition of the invention is similarly characterized by unusually high Viscosity Index (typically exceeding about 100) and very low pour point.

In a preferred embodiment, the third aspect of the invention includes a diamondoid component comprising at least about 15 different diamondoid compounds selected from the group consisting of methyl-substituted and ethyl-substituted adamantane, diamantane, and triamantane, wherein each of said selected diamondoid compounds comprises no more than about 7 weight percent of said composition. The composition preferably comprises from about 30 to about 70 weight percent substituted and unsubstituted adamantanes, from about 20 to about 60 weight percent substituted and unsubstituted diamantanes, and from about 3 to about 20 substituted and unsubstituted triamantanes. The composition may optionally comprise less than about 10 weight percent of adamantanes, diamantanes, or triamantanes.

The Viscosity Index for the diamondoid component of the grease compositions of the present invention consistently exceeds about 100. In preferred embodiments, the Viscosity Index of the diamondoid component of the grease compositions of the present invention exceeds about 110, and in a particularly preferred embodiment the Viscosity Index exceeds about 115. The diamondoid-based component of the grease composition of the invention may be produced by mixing individual diamondoid components, by blending mixtures of diamondoids, by fractionating and treating a naturally occurring diamondoid mixture, or by selectively alkylating diamondoids with selected olefins. U.S. Pat. No. 5,120,899 to Chen and Wentzek teaches a method for recovering a diamondoid-containing mixture from a natural gas stream, and is incorporated by reference as if set forth at length herein.

The diamondoid component of the grease composition of the invention typically contains less than about 10 weight percent $CH_9$-components, preferably less than about 5 weight percent $C_9$- components. The first preferably contains less than about 5 weight percent aromatics, and more preferably less than about 1 weight percent aromatics. The composition preferably contains a minimum of color bodies (also referred to as colorants) and may be treated with a sorbent such as activated carbon or activated alumina to remove such compounds. In a particularly preferred embodiment, the diamondoid component is substantially free of $C_9$-components, particularly $C_9$-aromatics.

The diamondoid component of the grease composition of the invention is most preferably used neat to maintain its superior thermal and oxidative stability, but may be blended, if desired, with a synthetic or petroleum-based lubricant stock. Examples of useful synthetic lubricant blending stocks are taught in U.S. Pat. Nos. 4,943,383 to Avery et al., 4,952,303 to Bortz et al., 4,962,249 to Chen et al., 4,967,029 to Wu, 4,967,032 to Ho et al., 4,990,709 to Wu, 4,990,718 to Pelrine, 4,990,238 to Cruzman et al., 4,992,189 to Chen et al., 4,995,962 to Degnan, Jr., et al., 5,012,020 to Jackson et al., 5,015,795 to Pelrine, 5,068,046 to Blain et al., and 5,095,165 to Hsia Chen. These patents are incorporated herein for teaching synthetic lubricant blending components.

The diamondoid component of the grease composition of the invention may suitably comprise a major portion of diamondoid compounds, for example, at least about 80 weight percent. The diamondoid component preferably contains at least about 90 weight percent diamondoid compounds and more preferably contains 98 weight percent or more of diamondoid compounds. The diamondoid component of the grease typically contains at least 65 weight percent alkyl-substituted diamondoid compounds.

The composition of the invention behaves in an unusual and surprising manner at low temperatures. Specifically, the composition of the invention can be distilled to remove lower-boiling components without significantly increasing its freeze point. This unusual characteristic is of critical importance to its properties as a viscous filler material or grease for fiber optic cables. The composition of the invention is generally characterized by a freeze point of less than $-40°$ C.

In one preferred embodiment, the diamondoid component of the grease composition of this invention comprises diamondoid compounds having at least one unsubstituted bridgehead hydrogen which have been selectively alkylated with at least one $C_6+\beta$-olefin in the presence of an acidic catalyst selected from the group consisting of $AlX_3$ and $BX_3$ wherein X is a halogen, and in the absence of an added active proton-containing additive. The term "active proton-containing additive" as used herein refers to active proton-containing compounds such as water, alcohols, and HX, wherein X is a halogen, which compounds can readily release a proton. Selectively alkylating diamondoid compounds with an $\alpha$-olefin in the absence of an added active proton-containing additive avoids substantial self-polymerization of the $\alpha$-olefin alkylating agent. This selectively alkylated diamondoid mixture is more fully disclosed in U.S. application Ser. No. 08/070,823, filed Jun. 3, 1993 now U.S. Pat. No. 5,345,020, (Mobil Docket 7065) which is incorporated by reference as if set forth at length herein.

In another preferred embodiment, the diamondoid component of the grease composition of this invention comprises alkyl-substituted adamantanes wherein the ratio of linear to branched alkyl substituents is at least about 1:1, preferably at least about 4:1, and wherein the average number of alkyl substitutions per diamondoid molecule is from about 1.5 to about 4. The lubricant composition of the invention is generally characterized by a Bromine Number (prior to hydrogentaion) of less than about 13, preferably less than about 5. This selectively alkylated diamondoid mixture is more fully disclosed in U.S. application Ser. No. 08/070,815, filed Jun. 3, 1993 now allowed, (Mobil Docket 7068) which is incorporated by reference as if set forth at length herein.

DETAILED DESCRIPTION

Figure 1:
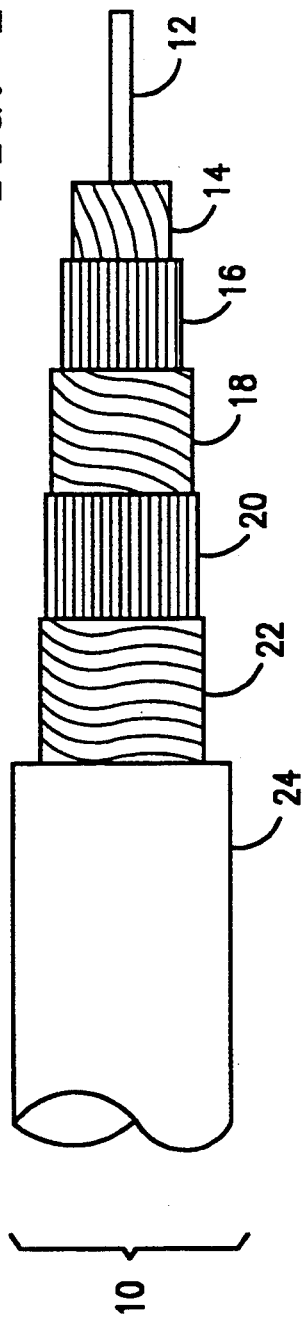
FIG. 1 is a simplified diagram showing an embodiment of the fiber optic cables of the invention.

Referring now to FIG. 1, a fiber optic cable in accordance with the present invention is shown at 10. An optic fiber 12, suitable for use as an optical waveguide extends along the axis of the cable. During manufacture of the cable, the grease of the present invention 14 is applied over the optic fiber. Note that grease film thicknesses in FIG. 1 are not shown to scale. Surrounding grease 14 is sheath 16. Additional layers of grease, 18 and 22, may optionally be applied in sequence with outer sheaths 20 and 24, if desired.

The sheath material should be flexible, lightweight, and of high tensile and flexural strength. Kevlar 49, an aramid fiber manufactured by E. I. DuPont de Nemours and Company is the preferred sheath material. The Kevlar sheath is helically wound upon the grease coated optical fiber. Similarly, if additional sheaths are desired, the grease of the present invention may be applied to the underlying sheath material and the next concentric sheath is wound upon the previous grease coated sheath. For a detailed description of a useful manufacturing method for the fiber optic cable of the present invention, see U.S. Pat. No. 4,441,787 to Lichtenberger at column 4, line 8 et seq. For cable lubricating means, see U.S. Pat. No. 4,749,059 to Jonnes et al., which teaches a cable lubricating device useful for applying grease to a fiber optic cable.

Figure 2:
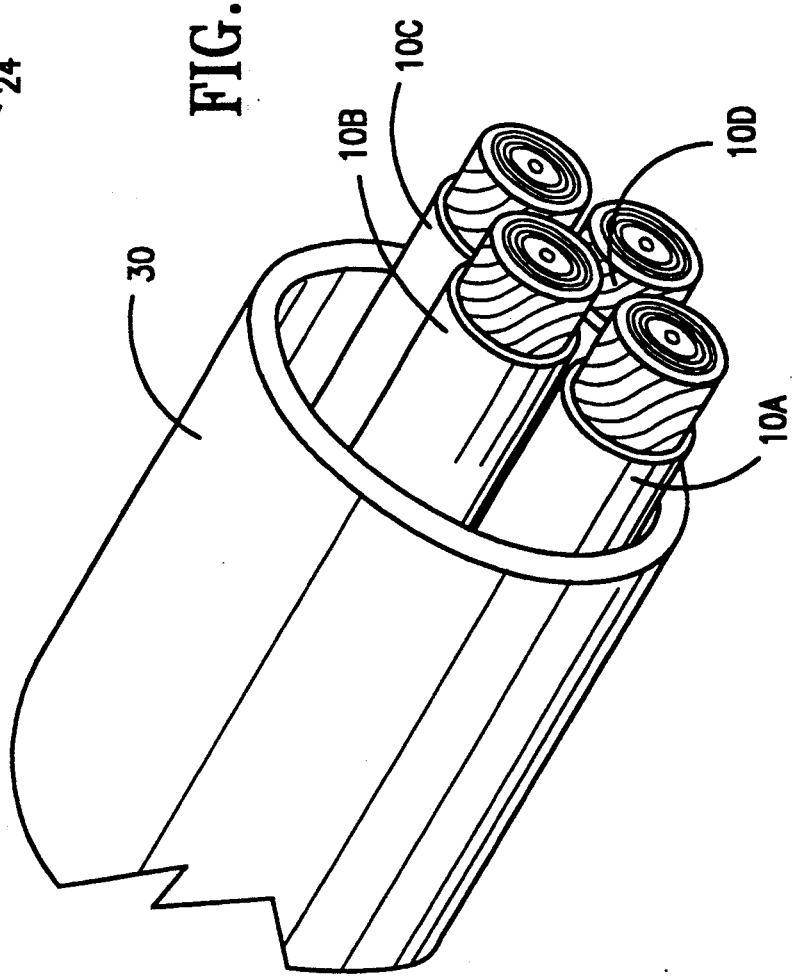
FIG. 2 is simplified diagram showing fiber optic cables of the invention in a conduit.

FIG. 2 shows four (4) optical cables of the type illustrated in FIG. 1, 10A through 10D, which are encased in a conduit 30. The grease composition of the present invention may suitably be applied to the outer sheath (shown as reference numeral 24 in FIG. 1) of each optic cable before it is drawn through the conduit during installation. Because the grease of the present invention retains its viscosity and lubricity over a broad range of temperatures, installations need not be limited to moderate temperature conditions to assure effective lubrication during the cable drawing procedure, and may be conducted during extreme cold conditions as low as $-40°$ C. For a general description of optic cable drawing, see U.S. Pat. No. 4,602,763 to Gaylin, which is incorporated by reference as if set forth at length herein.

Preparation of the Diamondoid Component of the Grease

In one embodiment of the grease composition, preparing the diamondoid component of the grease requires no chemical conversion steps but is restricted to processing via selective separation for example, removal of light ($C_9$-) hydrocarbons and non-hydrocarbons. Examples of non-hydrocarbons include polar sulfur and nitrogen compounds or polar corrosion inhibitors which may be injected upstream in the natural gas production equipment as well as naturally occurring color bodies. Examples of such useful sorptive media include gamma-alumina, activated charcoal, sand, and clay, merely to name a few. The diamond compound-containing mixture may optionally be hydrotreated to reduce total sulfur and/or to improve color.

The diamondoid component of the grease composition of the invention may be further processed (e.g., distilled) while maintaining substantially constant freeze point. The diamondoid component of the grease composition of the invention exhibits unusual freeze point behavior upon distillation. Distilling the diamondoid component of the grease composition of the invention to remove lower boiling fractions does not significantly increase the freeze point of the mixture. Previously known compositions compromised thermal and oxidative stability, as well as inertness, to meet a freeze point specification by blending a viscous lubricant component with a low freeze point diluent such as cyclohexane. The composition of the present invention requires no such compromise. This behavior stands in marked contrast to that of previously known viscous lubricant mixtures which require the addition of a low freeze point diluent.

Treatment with Sorbent

In accordance with the present invention, it has been found that the thermal and oxidative stability of certain diamondoid mixtures may be easily converted into thermally and oxidatively stable grease components by percolation through a suitable medium to sorb impurities such as polar sulfur and nitrogen compounds or polar corrosion inhibitors. Examples of such sorptive media include gamma-alumina, activated charcoal, sand, and clay, merely to name a few. The sorption step may be used in conjunction with a distillation step to adjust the composition of the diamondoid component as needed.

The sorption step may suitably be conducted at ambient temperature and atmospheric pressure, but may also be conducted under elevated conditions of temperature and pressure. For example, suitable temperature for the sorption step range from about 20° to about 50° C., and suitable pressures range from about atmospheric to about 100 psig.

Hydrotreating Processes

The diamondoid component of the grease composition of the invention may optionally be treated under hydrogen pressure in the presence of a hydrotreating catalyst of the type typically used in the petroleum refining industry for desulfurization, denitrogenation, and demetallation of hydrocarbonaceous feedstocks.

Suitable catalysts include metals on an inert or catalytically active support as a heterogeneous catalyst. Useful heterogeneous catalysts may contain metals from Groups IVA or VIIIA of the Periodic Table of the Elements, published by Sargent-Welch of Skokie, Ill. (catalog no. S-18806). Sulfides and oxides of these metals are also useful catalyst components. Specific examples of useful metals, metallic oxides and sulfides within these groups are exemplified by sulfides and oxides of Ni, Mo, W, Co, Pt, Pd, Cu, and Cr. Bimetallic catalysts including Ni—Mo, Ni—W, Co—Mo, and Cu—Cr are particularly preferred.

Both inert and catalytically active binders may be employed, with examples including one or more of alumina, silica, silica-alumina, zeolites, clays, Kieselguhr, and active carbons from sources such as coal, coke, and coconut shell.

The above-listed metals may also be exchanged onto zeolites to provide a zeolite catalyst having dehydrogenation activity. Suitable zeolites include those commonly referred to as large pore, i.e., those zeolites having a Constraint Index of less than about 1, such as zeolite X, and zeolite Y as well as those commonly referred to as medium-pore, i.e., those zeolites having a Constraint Index of from about 1 to about 12. Examples of suitable medium-pore zeolites include ZSM-5, ZSM-11, ZSM-12, ZSM-22, ZSM-23, ZSM-35, and ZSM-48. Zeolite Beta, known to exhibit characteristics of either a large pore zeolite or a medium-pore zeolite, is also useful in the present invention.

The zeolite-containing catalysts useful in the hydrotreating process of the present invention more preferably include those catalysts which exhibit Constraint Indices of from about 0.1 to about 10, for example ZSM-5, MCM-22 and Zeolite Beta, although it is well recognized that the Constraint Index of zeolite Beta varies widely with temperature. Zeolite Beta is described in U.S. Pat. Nos. 4,696,732; 3,308,069, as well as Re. No. 29,341, the entire contents of which are incorporated by reference as if set forth at length herein.

A convenient measure of the extent to which a zeolite provides control to molecules of varying sizes to its internal structure is the Constraint Index of the zeolite. The method by which the Constraint Index is determined is described in U.S. Pat. No. 4,016,218, incorporated herein by reference for details of the method. U.S. Pat. No. 4,696,732, cited above, discloses Constraint Index values for typical zeolite materials and is incorporated by reference as if set forth at length herein for detailed catalyst descriptions and Constraint Index values.

Zeolite ZSM-5 and the conventional preparation thereof are described in U.S. Pat. No. 3,702,886, the disclosure of which is incorporated herein by reference. Other preparations for ZSM-5 are described in U.S. Pat. Nos. Re. 29,948 (highly siliceous ZSM-5); 4,100,262 and 4,139,600, the disclosure of these is incorporated herein by reference. Zeolite ZSM-12 and the conventional preparation thereof are described in U.S. Pat. No. 3,832,449, the disclosure of which is incorporated herein by reference.

Catalysts such as ZSM-5 combined with a Group VIII metal described in U.S. Pat. No. 3,856,872, incorporated by reference as if set forth at length herein, are also useful in the present invention.

Additional catalytic materials useful in the present invention include materials which are readily identified by their characteristic X-ray diffraction patterns, such as the PSH-3 composition of U.S. Pat. No. 4,439,409, incorporated herein by reference, and MCM-22, the synthesis and composition of which is taught in U.S. Pat. No. 4,954,325, both of which patents are incorporated by reference as if set forth at length herein.

The optional hydrotreating step may suitably be conducted under the conditions listed below in Table 1.

TABLE 1

| Hydrotreating Reaction Conditions | | |
|---|---|---|
| Process Variable | Broad | Preferred |
| Temperature, °C. | 30–220 | 50–180 |

TABLE 1-continued

| Hydrotreating Reaction Conditions | | |
|---|---|---|
| Process Variable | Broad | Preferred |
| WHSV, based on catalyst | 0.01–100 | 0.1–5 |
| Pressure, kPa | 100–14,000 | 170–7000 |
| Hydrogen Dosage, Mols $H_2$/Mol diamondoid mixture | 0.05–100 | 1–10 |

The Grease Thickener

The grease composition of the invention comprises a thickener which is substantially inert to the fiber optic cable sheath. Examples of useful grease thickeners include those taught in U.S. Pat. Nos. 4,961,868, 5,068,045, and 5,084,194, each to Doner, Horodysky, and Keller, and incorporated by reference as if set forth at length herein. For a general survey of useful grease thickeners, see Klamann, Lubricants 389–422 (1984). Examples of useful thickeners (colloidal fillers) for optic fiber cable greases are also taught in U.S. Pat. No. 4,810,395 to Levy et al. at column 4, line 33, through column 5 at line 30, and the Levy et al. patent is incorporated by reference as if set forth at length herein. Specific examples of useful thickeners include colloidal silica, fatty acid soaps, clays, bentonites, styrene-rubber or styrene-rubber-styrene block copolymers, as well as semi-liquid rubbers, such as polyisobutylene, merely to name a few. Colloidal silica is preferred, and a hydrophobic fumed silica having a BET surface area between about 50 and about 400 $m^2$/g is more preferred. Cab-O-Sil N70-TS brand fumed silica produced by the Cabot Corporation of Tuscola, Ill. is a particularly preferred thickener.

Thickener dosage typically ranges between about 3 and about 20 wt % of the total grease composition, usually from about 6 to about 10 wt %, and preferably from about 6 to about 7 wt %.

Examples

Examples 1–10 illustrate diamondoid mixtures useful in the grease composition of the present invention. Compositions for Examples 1, 2, and 4 are shown in Table 2, while Table 3 shows properties of the diamondoid mixtures.

Example 1

A raw diamondoid-containing fluid was distilled to remove the light end. The residual liquid was further treated to remove of any color components in the product by passing the liquid through an activated alumina column at room temperature.

Example 2

Example 1 was repeated except the distillation was carried out further to remove all adamantanes.

Example 3

Example 1 was repeated except the distillation was carried out further to remove all adamantanes and diamantanes.

Example 4

Example 1 was repeated with a different starting diamondoid mixture.

Example 5

1-Ethyl adamantane was prepared by hydrogenating 1-vinyl adamantane (M. Zuanic, et al. J. Poly. Sci. Lett. Ed. 19, 387-9, 1981) using Ni/SiO$_2$ catalyst at 100° C. and 200 psi.

Example 6

1,3-Dimethyladamantane was obtained from Aldrich Chemical Co.

Example 7

Decyl adamantane was prepared by reacting 140 g 1-decene, 54.4 gram adamantane in 100 cc n-hexane solvent and using 3 mmoles 1.0M AlBr$_3$ in CH$_2$Br$_2$ or AlBr$_3$ catalyst at 15°-50° C. reaction temperature. The product was isolated by quench the catalyst with dilute acid and aqueous work-up followed by distillation at 155° C. and 0.2 mm-Hg using a Kugelrohr to remove any C$_{20}$-material. The C$_{30}$+ fraction was obtained in 80% yeild. It was hydrogenated at 200° C. and 500 psi H$_2$ using 1 wt. % Ni/SiO$_2$ catalyst.

Example 8

Decyl (whole) diamondoid fluid was prepared by adding 300 g 1-decene to a mixture of 300 g diamondoids from Example 1, 0.50 g water, and 10.0 g anhydrous AlCl$_3$ maintained at 40°-51° C. over 8 hours. The reaction mixture was heated t 40° C. for another 10 hours after finishing adding 1-decene. Following aqueous work-up, the crude product was vacuum distilled to remove low-boiling starting material and products up to a b.p. of 160° C./0.78 mm-Hg to give 449 g high boiling products. The latter was hydrogenated at 200° C. and 500 psi H$_2$ using 1 wt. % Ni/SiO$_2$ catalyst.

Example 9

Decyl adamantanes were prepared in a similar method as Example 8 except the starting diamondoid fluid contained only the adamantane fraction, which was isolated from the distillation process described in Example 2. The crude product was distilled till 158° C./0.61 mm-Hg.

Example 10

Example 10 repeated Example 9, except the hydrogenated products were further distilled to remove lower-boiling products up to 164° C./0.65 mm-Hg.

The products in examples 1 to 6 have very high VI and low pour points. The products in examples 7 to 9 have much better thermal stabilities than the existing PAO, as indicated by much smaller amount of viscosity loss than PAO when tested at 288° C. under nitrogen for 72 hours.

TABLE 2

| Compounds* | Example 1 | Example 2 | Example 4 |
|---|---|---|---|
| adamantane | 1.364 | none | 1.234 |
| 1-methyl adamantane | 5.615 | none | 7.617 |
| 1,3-dimethyl adamantane | 6.070 | none | 10.174 |
| 1,3,5-trimethyl adamantane | 2.438 | none | 4.796 |
| 1,3,5,7-tetraamethyl adamantane | 0.413 | none | 0.713 |
| 2-methyl adamantane | 1.003 | none | 1.754 |
| t-1,4-Dimethyl adamantane | 1.514 | none | 2.980 |
| c-1,4-Dimethyl adamantane | 1.516 | none | 3.459 |
| 1,3,6-Trimethyl adamantane | 1.774 | none | 4.083 |
| 1,2-Dimethyl adamantane | 1.483 | | 3.368 |
| 1r, 3,4t-Trimethyl adamantane | 2.056 | | 4.647 |
| 1r, 3,4c-Trimethyl adamantane | 2.117 | | 4.898 |
| 1,3,5,6-tetramethyl adamantane | 2.044 | | 5.308 |
| 1-ethyl adamantane | 0.630 | | 1.523 |
| 2,6-; 2e,4e-; 2e,4a-diMe Ad | 0.118 | | 0.285 |
| 1,2,3,5-tetramethyl | 0.07 | | 0.17 |
| 1-ethyl-3-methyl adamantane | 2.16 | | 5.17 |
| 1,2,3-Trimethyl adamantane | 0.34 | | 0.81 |
| 1-ethyl-3,5-dimethyl adamantane | 1.582 | 0.012 | 3.909 |
| 1-ethyl-3,5,7-trimethyl adamantane | 0.424 | | 1.031 |
| 1,2,3,5,7-pentamethyl adamantane | 1.050 | 0.029 | 2.489 |
| Other adamantanes | 14.432 | 6.631 | 23.083 |
| Total adamantanes | 50.213 | 6.672 | 93.501 |
| Diamantane | 3.967 | 5.560 | 1.342 |
| 4-Methyl-diamantane | 5.345 | 8.338 | 1.522 |
| 4,9-Dimethyl-diamantane | 1.710 | 2.784 | 0.400 |
| 1-Methyl-diamantane | 3.343 | 5.664 | 0.624 |
| 2,4-Dimethyl-diamantane | 2.078 | 3.611 | 0.395 |
| 1,4-dimethyl diamantane | 2.563 | 4.509 | 0.406 |
| 1,4,9-trimethyl diamantane | 1.103 | 1.981 | 0.196 |
| 3-methyl diamantane | 2.384 | 4.241 | 0.359 |
| 4,8-Dimethyl diamantane | 1.618 | 2.970 | 0.195 |
| 4-Ethyl-diamantane | 0.584 | 1.206 | 0.043 |
| Other diamantanes | 16.597 | 34.282 | 1.017 |
| Total diamantanes | 41.292 | 75.146 | 6.499 |
| Triamantane | 1.175 | 2.608 | 0.017 |
| 9-methyl triamantane | 1.151 | 2.583 | 0.016 |
| 9,15-dimethyl triamantane | 0.233 | 0.521 | |
| 3-Me & 3,9-diMe triamantanes | 0.696 | 1.560 | |
| 7,9-diMe & 3,9,15-triMe triamantanes | 0.489 | 1.136 | |
| 4-Me & 4,9,15-triMe triamantanes | 0.440 | 0.973 | |
| 4,9- & 6,9-dimethyl triamantanes | 0.184 | 0.419 | |
| 5-methyl triamantane | 0.289 | 0.661 | |
| 5,9-methyl triamantane | 0.180 | 0.395 | |
| 8-Me & 5,9,15-triMe triamantanes | 0.244 | 0.585 | |
| 9,14-dimethyl triamantanes | 0.144 | 0.238 | |
| 8,9-dimethyl triamantanes | 0.069 | 0.210 | |
| 16-methyl-, a diMe- & a triMe-triamantanes | 0.366 | 0.837 | |
| 2-methyl triamantane | 0.118 | 0.302 | |
| other triamantanes | 1.857 | 4.402 | |
| Total triamantanes + methyl and dimethyl derivatives | 7.605 | 17.430 | 0.033 |
| iso-tetramantane + A + B | 0.119 | 0.283 | |
| anti-tetramantane | 0.023 | 0.059 | |
| other tetramantanes | 0.139 | 0.410 | |
| Total tetramantane | 0.281 | 0.752 | 0.000 |

This sample contained 6.821% of lower boiling materials.
*Prefixes a-, e-, c-, and t- refer to axial, equatorial, cis-, and trans- relationship of substituents in the same cyclohexane ring bearing the substituents in the diamondoids.

TABLE 3

Properties of Diamondoid and Alkyldiamondoids

| Example No. | Product Type | Initial BP °F. | Visc. at 100° C., cS | VI | Pour Point, °C. | % Visc loss (a) |
|---|---|---|---|---|---|---|
| 1 | | ~400 | 2.4 | 101 | −94 | |
| 2 | 6:4 diamantanes: triamantanes | ~650 | 4.9 | 126 | −72 | |
| 3 | 9:1 triamantanes: tetramantanes | ~750 | 9.1 | 103 | −40 | |
| 4 | Partially solid (at ambient) diamondoids | ~400 | 1.7 | 118 | — | |
| 5 | 1-ethyl adamantane | 440 | 1.6 | 118 | −58 | |
| 6 | 1,3-dimethyl adamantane | 410 | 1.2 | 163 | −29 | |
| 7 | decyl adamantane | >750 | 12.03 | 124 | — | +1.4 |
| 8 | decyl (whole) | >750 | 14.28 | 89 | −37 | −5.4 |

TABLE 3-continued

Properties of Diamondoid and Alkyldiamondoids

| Example No. | Product Type | Initial BP °F. | Visc. at 100° C., cS | VI | Pour Point, °C. | % Visc loss (a) |
|---|---|---|---|---|---|---|
| | diamondoids | | | | | |
| 9 | decyl adamantanes | >750 | 12.38 | 98 | −45 | −13.9 |
| 10 | decyl adamantanes | >750 | 14.5 | 98 | −40 | — |
| 11 | Comparative PAO Sample A | >750 | 5.59 | 131 | −54 | −25 |
| 12 | Comparative PAO Sample B | >750 | 39.11 | 148 | −36 | −30 |

(a) % viscosity loss was measured the viscosity loss after heating the oil to 288° C. for 72 hours under nitrogen. Positive number indicated viscosity increase. Negative number indicated viscosity loss. PAO Samples A and B (Examples 11 and 12) are commercial polyalphaolefin lubricant basestocks.

The diamondoid mixtures described above exhibit lower pour points than conventional mineral oils, thus producing an optic fiber cable grease which allows the optic fiber cable to remain flexible even in extreme low temperature applications. Further, because these diamondoid mixtures have markedly higher Viscosity Indices than typical mineral oils, the grease of the present invention retains stable viscosity over wide temperature ranges. Because the diamondoid mixtures of the invention exhibit much higher fluid densities than mineral oil or a polyalphaolefin (PAO) lubricant stock, the diamondoid mixtures of the invention more effectively suspend thickening solids and provide a more homogeneous filling grease which is less susceptible to phase separation than a conventional mineral oil- or PAO-containing grease.

Changes and modification in the specifically described embodiments can be carried out without departing from the scope of the invention which is intended to be limited only by the scope of the appended claims.

What is claimed is:

1. A fiber optic cable assembly comprising:
   (a) at least one optical fiber;
   (b) a sheath longitudinally surrounding and substantially concentric with said optical fiber;
   (c) a grease in contact with said optical fiber and said sheath, said grease comprising a diamondoid component which has been processed to remove at least a portion of organics having fewer than 10 carbon atoms, said diamondoid component comprising at least about 65 weight percent alkyl-substituted diamondoid compounds; and a thickener component which is substantially inert to said sheath.

2. The fiber optic cable of claim 1 wherein said diamondoid component of said grease further comprises at least about 65 weight percent of diamondoid compounds which have more than one quaternary carbon atom per molecule and less than about 35 weight percent of diamondoid compounds which have less than two quaternary carbon atoms per molecule.

3. The fiber optic cable of claim 1 wherein said grease further comprises at least about 70 weight percent of diamondoid compounds.

4. The fiber optic cable of claim 3 wherein said grease further comprises at least about 80 weight percent of diamondoid compounds.

5. The fiber optic cable of claim 1 wherein said grease further comprises diamondoid compounds having at least one unsubstituted bridgehead hydrogen which diamondoid compounds have been seletively alkylated with at least one $C_6+\alpha$-olefin in the presence of an acidic catalyst selected from the group consisting of $AlX_3$ and $BX_3$ wherein X is a halogen, and in the absence of an added active proton-containing additive.

6. The fiber optic cable of claim 1 wherein said grease further comprises alkyl-substituted adamantanes wherein the ratio of linear to branched alkyl substituents is at least about 1:1, preferably at least about 4:1, and wherein the average number of alkyl substitutions per diamondoid molecule is from about 1.5 to about 4.

* * * * *